United States Patent [19]
Homma et al.

[11] Patent Number: 4,701,508
[45] Date of Patent: Oct. 20, 1987

[54] SOLVENT SOLUBLE FLUORINE-CONTAINING POLYMER, COATING COMPOSITION CONTAINING THE SAME AND COATING PROCESS THEREOF

[75] Inventors: Shirou Homma; Takashi Izumi; Sakae Murakami, all of Yamaguchi, Japan

[73] Assignee: Mitsui Sekiyu Kagaku Kogyo Kabushiki Kaisha, Tokyo, Japan

[21] Appl. No.: 808,241

[22] Filed: Dec. 12, 1985

[30] Foreign Application Priority Data

Dec. 14, 1984 [JP] Japan ................. 59-263017
May 13, 1985 [JP] Japan ................. 60-99688
May 28, 1985 [JP] Japan ................. 60-113075
May 30, 1985 [JP] Japan ................. 60-115425
Nov. 11, 1985 [JP] Japan ................. 60-250939

[51] Int. Cl.$^4$ ............................................ C08F 14/18
[52] U.S. Cl. ................................. 526/249; 526/253; 526/254; 526/255
[58] Field of Search ............... 526/249, 253, 254, 255

[56] References Cited

U.S. PATENT DOCUMENTS 2,596,967  5/1952  Frost ........................... 526/249
2,847,409  8/1958  de Benneville et al. ......... 526/254
3,781,251  12/1973 Hermes ......................... 260/80.71

*Primary Examiner*—Paul R. Michl
*Assistant Examiner*—Peter D. Mulcahy
*Attorney, Agent, or Firm*—Wenderoth, Lind & Ponack

[57] ABSTRACT

A solvent soluble fluorine-containing polymer according to the present invention is a copolymer characterized by
(i) consisting substantially of
  (a) fluoroolefin,
  (b) vinyl ether, and
  (c) an organosilicon compound having an olefinically unsaturated bond and a hydrohyzable group,
(ii) said copolymer comprising, based on the total mole number of said (a)-(c) in the copolymer, 30–70 mol % of (a), 20–60 mol % of (b) and 1–25 mol % of (c) and
(iii) said copolymer having a number average molecular weight (Mn) of 3000–200000 as measured by gel permeation chromatography.

Further, according to the present invention, a coating composition having excellent weathering resistance and solvent resistance comprising the above-memtioned solvent soluble fluorine-containing polymer and organic solvent is also provided. In addition a coating process of said coating composition is also provided.

7 Claims, No Drawings

SOLVENT SOLUBLE FLUORINE-CONTAINING POLYMER, COATING COMPOSITION CONTAINING THE SAME AND COATING PROCESS THEREOF

FIELD OF THE INVENTION

This invention relates to fluorine-containing polymers which are soluble in organic solvents and quickly curable at ordinary temperature, coating compositions containing such fluorine-containing polymers, and to a coating process of said coating compositions.

BACKGROUND OF THE INVENTION

In the field of application of exterior coatings to architectural structures, wheeled vehicles, ships, aircrafts, etc., there are utilized high-quality polyester or acryl type exterior coatings since the coatings used for the purpose intended are required to have excellent weathering resistance and permanence properties. However, outdoor durable years of existing coatings are short and even the above-mentioned high-quality coatings will lose their fine appearance and substrate protective properties in several years.

Because of their being excellent in weathering resistance, water resistance, solvent resistance, chemical resistance, release properties, low friction characteristics and water repellency, fluorine-containing polymers which are also quite stable thermally and chemically are suitable for use as surface treatment agents for various kinds of substrates or base materials. However, on account of their excellent properties as mentioned above, conventionally known fluorine-containing polymers are difficult to use as coating materials because they are difficultly soluble in organic solvents and hard to form films thereof. For instance, most of coating materials of fluorine-containing polymers known at present are powder coatings except for PVdF (polyvinylidene fluoride) which is used as an organic solvent dispersible type coating by utilizing its properties of being soluble in specific solvents at elevated temperatures. Moreover, since coating materials of fluorine-containing polymers mentioned above require high temperature baking at the time when their films are formed, the field in which they are used is limited to such places where heating equipments can be arranged. Furthermore, such heating equipments and baking step as required for the utilization of these coating materials are undesirable from the standpoint of the safety of workers engaged in the coating operation or the work environment. Under the circumstances, various attempts have been made in recent years to develop fluorine-containing polymers which are soluble in solvents or which do not require a high temperature baking step.

For example, Japanese Patent Laid-open Publn. No. 34107/1982 discloses quaternary copolymers comprising fluorolefin, cyclohexyl vinyl ether, alkyl vinyl ether and hydroxyalkyl vinyl ether, said copolymers being alleged to be soluble in organic solvents and capable of curing at ordinary temperature. However, for curing these copolymers at ordinary temperature, it is necessary to use melamine type hardeners or urea resin type hardeners, and hence the mode of using these copolymers is of the two-liquid type, resulting in reduced working efficiency. Furthermore, the glass transition temperatures of these copolymers are relatively high such as above ordinary temperature, i.e. 25° C. Moreover, Japanese Patent Publn. No. 39472/1971 suggests, though no concrete example is shown, that polymers obtained by mechanically treating PTFE (polytetrafluoroethylene) with organosilicon compounds having olefinically unsaturated bonds and hydrolyzable groups in the presence of such radical initiators as organic hydroperoxide are crosslinked and cured with water at ordinary temperature. The polymers prepared according to the above process, however, are polymers in which the organosilicon compounds have grafted on PTFE and are substantially insoluble in organic solvents.

Under the present circumstances, no fluorine-containing polymers which are soluble in organic solvents and curable at ordinary temperature are available.

OBJECTS OF THE INVENTION

A first object of the present invention aiming at the solution of the above mentioned technical problems associated with the prior art is to provide fluorine-containing polymers (hereinafter called "the fluoropolymers") which are soluble in organic solvents at low temperatures and curable at ordinary temperature without necessitating any special hardeners at the time of curing and which after curing have excellent properties such as weathering resistance, water resistance, chemical resistance, etc.

A second object of the present invention is to provide fluorine-containing coating compositions (hereinafter called "the fluoropolymer coating composition") which contain the fluoropolymers and which are excellent in adhesion to the surface of substrates or base materials such as metal and the like.

A third object of the present invention is to provide the fluoropolymer coating compositions which contain the fluoropolymers and which are excellent in adhesion to various kinds of epoxy resins.

A fourth object of the present invention is to provide a process for coating the fluoropolymer coating compositions on the surface of substrates or base materials such as metal and the like for the purpose of forming thereon coating films thereof which are excellent in adhesion strength.

SUMMARY OF THE INVENTION

The fluoropolymers of the present invention are soluble in organic solvents, which are copolymers characterized by
(i) consisting substantially of
  (a) fluoroolefin,
  (b) vinyl ether, and
  (c) an organosilicon compound having an olefinically unsaturated bond and a hydrolyzable group,
(ii) said copolymer comprising, based on the total mole number of said (a)–(c) in the copolymer, 30–70 mol% of (a), 20–60 molt% of (b) and 1–25 mol% of (c), and
(iii) said copolymer having a number average moleculare weight of 3000–200000 as measured by gel permeation chromatography.

In a first aspect, the fluoropolymer coating compositions of the present invention comprise the fuoropolymer and an organic solvent. In a second aspect, the present fluoropolymer coating compositions comprise the fluoropolymer, a metal chelate compound and an organic solvent. In a third aspect, moreover, the present fluoropolymer coating compositions comprise the floropolymer, an organic silicate and an organic solvent. In a fourth aspect, furthermore, the present fluoropolymer coating compositions comprise the fluoropolymer, a condensation reaction product of silane compound represented by the formula $R^1{}_nSi(OR^2)_{4-n}$ or partial hydrolyzate thereof and an epoxy-containing alcohol, said fluoropolymer coating compositions being excellent in adhesion to the surface of substrates or base materials such as metal and the like as well as to various kinds of epoxy resins.

DETAILED DISCLOSURE OF THE INVENTION

The fluoropolymers of the present invention are random copolymers comprising at least the aforementioned three kinds of monomer component units (a), (b) and (c). So long as the objects of the present invention are not marred, the present fluoropolymer may further be polymerized with small amounts of other copolymerizale monomer components such as α-olefins, cycloolefins and unsaturated carboxylic acids.

The fluoroolefin (a) which is one of the monomer constituents of the present fluoropolymers has in the molecule at least one fluorine atom and preferably includes perhaloolefins, in which hydrogen atoms of the olefin have all been substituted with fluorine atoms and other halogen atoms, particularly preferable are perfluoroolefins. From the standpoint of polymerizability and properties of the polymers as prepared by the use of the fluoroolefin (a), fluoroolefins having 2 or 3 carbon atoms, particularly perfluoroolefins are preferable.

Examples of such fluoroolefins as mentioned above include fluoroethylenes such as $CF_2=CF_2$, $CHF=CF_2$, $CH_2=CF_2$, $CH_2=CHF$, $CClF=CF_2$, $CHCl=CF_2$, $CCl_2=CF_2$, $CClF=CClF$, $CHF=CCl_2$, $CH_2=CClF$, and $CCl_2=CClF$; fluoropropenes such as $CF_3CF=CF_2$, $CF_3CF=CHF$, $CF_3CH=CF_2$, $CF_3CH=CH_2$, $CF_3CF=CHF$, $CHF_2CH=CHF$, $CF_3CH=CH_2$, $CH_3CF=CF_2$, $CH_3CH=CF_2$, $CH_3CF=CH_2$, $CF_2ClCF=CF_2$, $CF_3CCl=CF_2$, $CF_3CF=CFCl$, $CF_2ClCCl=CF_2$, $CF_2ClCF=CFCl$, $CFCl_2CF=CF_2$, $CF_3CCl=CClF$, $CF_3CCl=CCl_2$, $CClF_2CF=CCl_2$, $CCl_3CF=CF_2$, $CF_2ClCCl=CCl_2$, $CFCl_2CF=CCl_2$, $CF_3CF=CHCl$, $CClF_2CF=CHCl$, $CF_3CCl=CHCl$, $CHF_2CCl=CCl_2$, $CF_2ClCH=CCl_2$, $CF_2ClCCl=CHCl$, $CCl_3CH=CHCl$, $CF_2ICF=CF_2$, $CF_2BrCH=CF_2$, $CF_2CBr=CHBr$, $CF_2ClCBr=CH_2$, $CH_2BrCF=CCl_2$, $CF_3CBr=CH_2$, $CF_2CH=CHBr$, $CF_2BrCH=CHF$, $CF_2BrCF=CF_2$; and fluorooelefins having 4 or more carbon atoms such as $CF_2CF_2CF=CF_2$, $CF_3CF=CFCF_2$, $CF_3CH=CFCF_3$, $CF_2=CFCF_2CHF_2$, $CF_3CF_2CF=CH_2$, $CF_3CH=CHCF_3$, $CF_2=CFCF_2CH_3$, $CF_2=CFCH_2CH_3$, $CF_3CH_2CH=CH_2$, $CF_3CH=CHCH_3$, $CF_2=CHCH_2CH_3$, $CH_3CF_2CH=CH_2$, $CFH_2CH=CHCFH_2$, $CH_3CF_2CH=CH_3$, $CH_2=CFCH_2CH_3$, $CF_3(CF_2)_2CF=CF_2$, $CF_3(CF_2)_3CF=CF_2$.

Of the fluoroolefins exemplified above, fluoroethylene and fluoropropenes are preferred as mentioned previously, and particularly tetrafluoroethylene ($CF_2=CF_2$) is preferable and furthermore, hexafluoropropene are preferred from the standpoint of the safety and handling thereof.

The use of the above-exemplified fluoroolefins either singly or in admixture is of course included in the embodiments of the present invention.

The vinyl ether (b) signifies compounds having ether linkages of vinyl group with alkyl group (including cycloalkyl), aryl group, or aralkyl group or the like group. Of these compounds, preferred are alkyl vinylethers, particularly those having ether linkages of vinyl group with alkyl groups having less than 8 carbon atoms, preferably 2 to 4 carbon atoms. More preferably are alkyl vinyl ethers having chain alkyl groups.

Examples of such vinyl ethers as mentioned above include chain alkyl vinyl ethers such as ethyl vinyl ether, propyl vinyl ether, isopropyl vinyl ether, butyl vinyl ether, tert-butyl vinyl ether, pentyl vinyl ether, hexyl vinyl ether, isohexyl vinyl ether, octyl vinyl ether, and 4-methyl-1-pentyl vinyl ether; cycloalkyl vinyl ethers such as cyclopentyl vinyl ether and cyclohexyl vinyl ether; aryl vinyl ethers such as phenyl vinyl ether, o-, m- and p-chlorotolyl vinyl ether, and aralkyl vinyl ethers such as benzyl vinyl ether and phenetyl vinyl ether.

Of these mentioned above, particularly preferable are chain alkyl vinyl ethers and cycloalkyl vinyl ethers, and also preferred are ethyl vinyl ether, propyl vinyl ether and butyl vinyl ether.

The use of vinyl ethers illustrated above either singly or in admixture is of course included in the embodiments of the present invention.

The organosilicon compound (c) may be those having in the molecule olefinically unsaturated bonds and hydrolyzable groups, and concretely they may be exemplified by way of such compounds as represented by the following general formulas (1)-(3).

$$R^1R^2SiY^1Y^2 \quad (1)$$

$$R^1XSiY^1Y^2 \quad (2)$$

$$R^1SiY^1Y^2Y^3 \quad (3)$$

wherein $R^1$ and $R^2$, which may be the same or different, are groups having olefinically unsaturated bonds and consisting of carbons, hydrogen and optionally oxygen, X is an organic radical having no olefinically unsaturated bond, and $Y^1$, $Y^2$ and $Y^3$, which may be the same or different, are hydrolyzable groups.

Concrete examples of $R^1$ and $R^2$ include vinyl, allyl, butenyl, cyclohexenyl and cyclopentadienyl, particularly preferred are terminal olefinically unsaturated groups such as $CH_2=CH-O-(CH_2)_3$ and the like. Other preferable examples include such groups having ester linkages of terminal unsaturated acids as $CH_2=C(CH_3)COO(CH_2)_3-$, $CH_2=C(CH_3)COO(CH_2)_2-O-(CH_2)_3-$ and

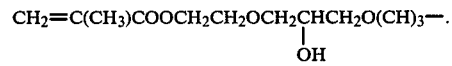

$$CH_2=C(CH_3)COOCH_2CH_2OCH_2CHCH_2O(CH)_3-.$$
$$\qquad\qquad\qquad\qquad\qquad\qquad |$$
$$\qquad\qquad\qquad\qquad\qquad\qquad OH$$

Of these groups, vinyl group is most preferred. Concrete examples of X include, for example, monovalent hydrocarbon radicals such as methyl, ethyl, propyl, tetradecyl, octadecyl, phenyl, benzyl and tolyl groups, and these groups may be halogen-substituted hydrocarbon radicals. Concrete examples of $Y^1$, $Y^2$ and $Y^3$ include, for example, such alkoxy and alkoxyalkoxy as methoxy, ethoxy, butoxy and methoxyethoxy, such acyloxy as formyloxy, acetoxy and propionoxy, oxim, e.g. $-ON=C(CH_2)_2$, $-OH=CHCH_2C_2H_5$ and $-ON=C(C_6H_5)_2$, and substituted amino group and arylamino group, e.g. —NHCH$_3$, —NHC$_2$H$_5$ and —NH(C$_6$H$_5$), including any other hydrolyzable organic radicals.

The organosilicon compounds which are preferably used in the present invention are those represented by the general formula (3), particularly preferred are those in which Y$^1$, Y$^2$ and Y$^3$ are the same. Of these usable organosilicon compounds, preferable are those in which R$^1$ is vinyloxyalkyl group (CH$_2$=CH—O—(CH$_2$)$_n$—) or vinyl group, and those in which Y$^1$, Y$^2$ and Y$^3$ are alkoxy or alkoxyalkoxy groups, for example, vinyloxypropyl trimethoxysilane, vinyl trimethoxysilane, vinyl triethoxysilane, vinyl tris(methoxyethoxy)silane and the like. However, also usable are vinyl methyldiethoxysilane, vinyl phenyldimethoxysilane and the like.

In the fluoropolymers of the present invention, the proportions of the monomer components (a)–(c) are, based on the total number of (a)–(c), (a): 30–70 mol%, (b): 20–60 mol%, and (c): 1–25 mol% ((a)+(b)+(c)=100), and in most cases, the proportions are in the range of (a): 40–60 mol%, (b): 20–60 mol%, and (c): 5–20 mol%.

The present fluoropolymers usually have the number average molecular weight ($\overline{Mn}$) ranging from 3000 to 200000, preferably from 5000 to 100000 as measured by gel permeation chromatography (GPC) using monodispersed polystyrene having the known molecular weight as a standard substance. By virtue of having such constituent proportions and molecular weights as mentioned above, the present fluoropolymers come to be soluble in solvents and excellent in film coating properties, and after curing by the process mentioned later the cured fluoropolymers come to have excellent properties such as solvent resistance, chemical resistance, weathering resistance, heat resistance and mechanical properties.

In another aspect of physical properties, the present fluoropolymers are non-crystalline or of low crystallinity, mostly are non-crystalline. Usually most of the present fluoropolymers have a crystallinity of 0% as measured by X-rays, and have their melting point which is not observed by means of a differential scanning calorimeter (DSC). Thus, the present fluoropolymers are excellent in transparency.

The present fluoropolymers have a glass transition temperature (Tg) usually ranging from −60° to +20° C., preferably from −40° to +5° C. as measured by DSC using the test samples after cooling to −120° C. at a temperature rise rate of 10° C./min.

The present fluoropolymers have as optical properties a refractive index usually ranging from 1.48 to 1.34, preferably 1.44 to 1.36.

The present fluoropolymers may be prepared by copolymerizing the aforementioned monomers (a), (b) and (c) in the presence of known radical initiators. In this case, all the components (a)–(c) are important, no copolymerization will take place by the use of components (a) and (c) only but by the addition of the component (b), the components (a), (b) and (c) copolymerize.

Usable as radical initiators in this copolymerization are various kinds of known initiators. Useful initiators concretely include organic peroxides and organic peresters, for example, benzoyl peroxide, dichlorobenzoyl peroxide, dicumyl peroxide, di-tert-butyl peroxide, 2,5-dimethyl2,5-di(per-oxybenzoate)hexine-3, 1,4-bis(tert-butylperoxyisopropyl)benzene, lauroyl peroxide, tert-bytyl peracetate, 2,5-dimethyl-2,5-di(tert-butylperoxy)-hexine-3, 2,5-dimethyl-2,5-di(tert-bytylperoxy)hexane, tert-buty perbenzoate, tert-butyl perphenyl acetate, tert-butylperisobutylate, tert-butyl per-secoctoate, tert-butyl perpivalate, cumyl perpivalate and tert-bytyl perdiethyl acetate, and azo compounds, for example, azobisisobutylnitrile and dimethyl azoisobutylate. Of these organic peroxides, preferable are dialkyl peroxides such as dicumyl peroxide, di-tert-butyl peroxide, 2,5-dimethyl-2,5-di(tert-butylperoxy)hexine-3, 2,5-dimethyl-2,5-di(tert-butylperoxy)hexane and 1,4-bis(-tert-butylperoxyisopropyl)benzene.

The copolymerization of the monomer components (a)–(c) is carried out in a reaction medium consisting of organic solvents. The organic solvents used herein include aromatic hydrocarbons such as benzene, toluene and xylene, aliphatic hydrocarbons such as n-hexane, cyclohexane and n-heptane, halogenated aromatic hydrocarbons such as chlorobenzene, bromobenzene, iodobenzene and o-bromotoluene, and halogenated aliphatic hydrocarbons such as tetrachloromethane, 1,1,1-trichloroethane, tetrachloroethylene and 1-chlorobutane.

The copolymerization is effected in the above-mnetioned solvent by the addition of $10^{-2} \sim 2 \times 10^{-3}$ mole, based on the total mole number of the monomers, of a radical initiator. The polymerization temperature employed is from −30° to +200° C., preferably 20°–100° C., and the polymerization pressure employed is 0–100 kg/cm$^2$G, preferably 0–50 kg/cm$^2$G.

By introducing a carboxyl group into the molecular chain of the fluoropolymers of the present invention, organic pigments or the like which may be contained in coating compositions may be improved in affinity for the composition. Examples of unsaturated carboxylic acids used for the purpose intended include such unsaturated carboxylic acids such as acrylic acid, methacrylic acid, -ethylacryl acid, maleic acid, fumaric acid, itaconic acid, citraconic acid, tetrahydrophthalic acid, methyltetrahydrophthalic acid, endocisbicyclo[2,2,1-]hepto-5-en-2,3-dicarboxylic acid (nadic acid Ⓡ) and methyl-endocis-bicyclo[2,2,1]hepto-5-en-2,3-dicarboxylic acid (methylnadic acid Ⓡ), and their halides, amides, imides, acid anhydrides and esters, i.e. malenyl chloride, maleimide, maleic anhydride, anhydrous citraconic acid, monomethyl maleate and dimethyl maleate.

The fluoropolymers of the present invention as illustrated hereinbefore are soluble at ordinary temperature in organic solvents, for example, aromatic hydrocarbons such as benzene, toluene and xylene, ketones such as acetone and methyl ethyl ketone, esters such as diethyl ether and dipropyl ether, alcohol such as ethanol, and halogenated hydrocarbons such as trichloromethane, dichloroethane and chlorobenzene.

Since the present fluoropolymers have the hydrolyzable organic radical originated in the organosilicon compound (c), a crosslinking reaction takes place between the molecular chains of the polymer when the present fluoropolymers are exposed to water, whereby the fluoropolymers are cured. By virtue of utilizing such properties, the present fluoropolymers can be used as coating materials after dissolving the polymers in organic solvents.

Usable as the organic solvents in the above case may be any solvents commonly used in the field of coating materials so long as they can dissolve the present fluoropolymers, for example, aromatic hydrocarbons such as benzene, xylene and toluene, ketones such as acetone and methyl ethyl ketone, ethers such as diethyl ether and dipropyl ether, and halogenated hydrocarbons such as trichloromethane, dichloroethane and chlorobenzene.

The amounts of such organic solvents used, though not particularly limited, are such that the coating compositions obtained come to have an appropriate viscosity so that the composition is easily applied on the substrate or base material surface.

By virtue of incorporating a metal chelate compound into the present fluoropolymer coating compositions comprising such fluoropolymers and organic solvents in accordance with the present invention, the present fluoropolymer coating compositions are improved in adhesion strength to such inorganic substrates or base materials as metals or ceramics, whereby the coating compositions can be coated directly on such substrate or base material surface without necessitating primer layers. Accordingly, characteristic properties of cured films of the fluoropolymer can sufficiently be exhibited, for instance, there is no fear of peeling of the applied fluoropolymer layer when the primer layer is attacked by organic solvents or light.

Basically, the metal chelate compounds used in the present invention may be any known metal chelate compounds, for example, those having Ti, Al, Zr, Co or Mn as central metal constituting chelate. Of these metal chelate compounds, preferable are those having Ti or Zr as central metal. The metal chelate compounds are obtained in a simple manner by reacting alkoxides of the metals mentioned above with chelating agents. The chelating agents used for the purpose intended include, for example, β-diketones such as acetyl acetone and 2,4-heptanedione, ketoesters such as methyl acetoacetate, ethyl acetoacetate and butyl acetoacetate, hydroxycarboxylic acids or esters or salts thereof such as lactic acid, salicyclic acid, malic acid, tartaric acid, methyl lactate, ethyl lactate, ethyl salicylate, phenyl salicylate, ethyl maleate, methyl maleate, methyl tartate, ethyl tartate and ammonium salt of lactic acid, ketoalcohols such as 4-hydroxy-4-methyl-2-pentanone and 4-hydroxy-2-heptanone, 4-hydroxy-4-4-methyl-2-heptanone, aminoalcohols such as monoethanolamine, diethanolamine, N-methylmonoethanolamine, N-ethylmonoethanolamine, N,N-dimethylethanolamine and N,N-diethylethanolamine, and enol type hydrogen compounds such as diethyl maleate ester, methylol melamine, methylol urea and methylol acrylamide. In accordance with the present invention, transparent coating materials are obtained by incorporating colorless or pale color metal chelate compounds into the present fluoropolymer which are transparent as aforesaid. Examples of such colorless or pale color metal chelate compounds are Ti(O-iC$_3$H$_7$)$_2$(OC$_8$H$_{16}$O)$_2$, Ti(O-nC$_4$H$_9$)$_2$(OC$_8$H$_{16}$O)$_2$, Ti(OC$_3$H$_7$)$_2$(CH$_3$CH-COOC$_2$H$_5$)$_2$, Zr(OC$_4$H$_9$)$_3$(C$_5$H$_7$O$_2$) and the like.

The amount of the metal chelate compound incorporated into the present fluoropolymer is 1-70 parts by weight, preferably 3-60 parts by weight based on 100 parts by weight of the fluoropolymer. When the proportion of the metal chelate compound is excessively low, no improvement of adhesive properties of the resulting fluoropolymer is observed, and the use of excessively high proportion of the metal chelate compound is undesirable because coating film of the resulting fluoropolymer become brittle.

In accordance with the present invention, moreover, by virtue of incorporating an organic silicate represented by the following general formula [I] into the coating composition comprising the present fluoropolymer and organic solvent, the resulting coating compositions are found to show excellent coatability with a slight increase in viscosity even when contacted with air. And moreover, there are obtained coating films having strong adhesin strength to the surface of substrate or base material even when irregularlity in thickness of the coating films occur.

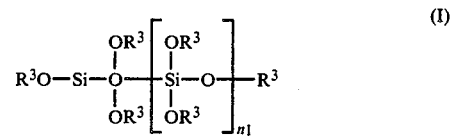

wherein R$^3$ is alkyl of 1 to 8 carbon atoms, allyl or aryl, and n$_1$ is zero or an interger of less than 11.

The organic silicates mentioned above are tetraalkyl, tetraallyl or tetraaryl orthosilicate or polyalkyl, polyallyl or polyaryl silicates. Concrete examples of usable organic silicates include, for example, methyl orthosilicate, ethyl orthosilicate, n-propyl orthosilicate, n-butyl orthosilicate, n-octyl orthosilicate, phenyl orthosilicate, benzyl orthosilicate, phenethyl orthosilicate, allyl orthosilicate, methallyl orthosilicate, and polysilicates formed by hydration condensation of these organic silicates. When organic silicates having substituents of the carbon number exceeding 8, because of low rate of hydrolysis, there is a fear that no coating films showing efficiently strong adhesive properties can be prepared. Where coating materials less in odor are intended to obtain from the standpoint of working atmosphere, the use of polysilicates, particularly those having n$_1$=2 is preferred.

Though the proportions of the fluoropolymer and the organic silicate used may be varied widely, the use of an excessively small proportion of the organic silicate results in low adhesive properties, and the use of excessively large proportion of the organic silicate results in brittleness of the resulting coating films. The organic silicate is preferably used therefore in an amount of 1-20 parts by weight, more preferably 3-15 parts by weight based on 100 parts by weight of the fluoropolymer.

Further, fluoropolymer coating compositions improved in adhesin strength to inorganic substrates or base materials such as metals or ceramics as well as in adhesive properties to epoxy resins are obtained by incorporating a condensation reaction product of a silane compound represented by the formula R$^4$$_{n2}$Si(OR$^5$)$_{4-n2}$ or partial hydrolyzate thereof with an epoxy-containing alcohol into the coating compositions comprising the fluoropolymer and organic solvent in accordance with the present invention.

The silane compounds of the formula R$^4$$_{nz}$Si(OR$^5$)$_{4-nz}$ used in the above case include, for example, organic silicates of the formula in which n$_2$=0 such as tetramethyl orthosilicate, tetraethyl orthosilicate, tetra-n-propyl orthosilicate, tetra-n-butyl orthosilicate, tetraisopentyl orthosilicate, tetra-n-octyl orthosilicate, tetrapheynyl orthosilicate and tetraallyl orthosilicate, and organic silicates of the formula in which n$_2$=1 such as methyltrimethoxysilane, methyltriethoxysilane and ethyltriethoxysilane. The partial hydrolyzates of these silane compounds are oligomers such as dimers or trimers formed by hydration condensation of the silane compounds, as an example, those which are represented by the following formula.

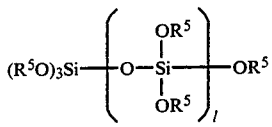

$l = 1, 2, 3 \cdots n_3$ $n_3$ is integer, and in ordinary cases less than 10.

The epoxy-containing alcohol used in the preparation of the condensation reaction product in the above instance are those containing at least one epoxy group in mono or polyhydric alcohol molecule, and this alcohol may be exemplified as in the following.

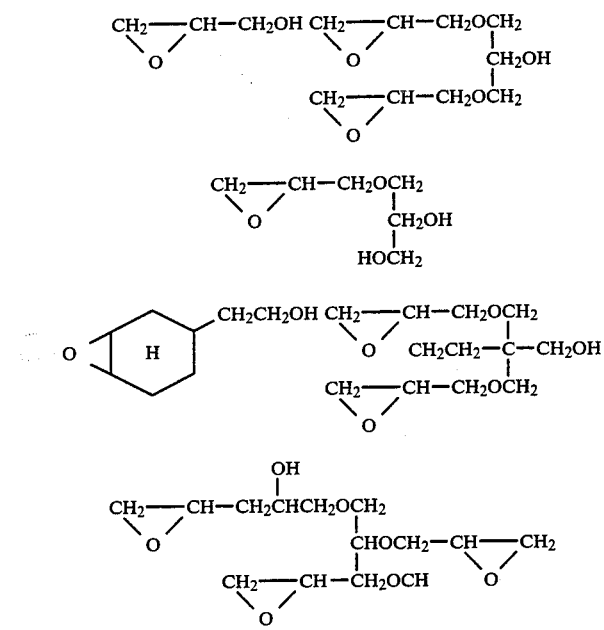

The condensation reaction products referred to above are obtained by reacting the above-mentioned silane compound with the epoxy-containing alcohol in the presence of known condensation catalyst. In this case, preferable are the products in which at least one hydrolyzable group remains. Accordingly, when the starting materials, for example, glycidol and tetramethyl orthosilicate, are used, preferably the reaction is carried out according to the following formula.

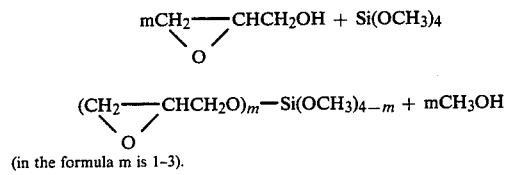

(in the formula m is 1-3).

In the present invention, moreover, in addition to the fluoropolymer, the above-mentioned condensation reaction product and the organic solvent, there may be use in combination therewith the same silane compound $R^4{}_{n2}Si(OR^5)_{4-n2}$ as the starting material component used in the above-mentioned condensation reaction or partial hydrolyzate thereof in order to further improve adhesion strength to epoxy resins. In this case, the silane compound or hydrolyzate thereof is preferably selected from those in which $R^4$ and $R^5$ are alkyl or aryl, particularly alkyl. If the carbon number of $R^4$ and $R^5$ is excessively large, the rate of hydrolysis becomes low at the time of curing reaction and strong adhesive properties are difficult to attain, and hence the upper limit of carbon number is desirably 8. Where the partial hydrolyzate is added, if the molecular weight of such oligomer as mentioned above is large, the viscosity increases to lower the efficiency of the coating operation, and hence the hydrolyzates of up to about undecaner is preferably used. Though the proportions of the fluoropolymer and the condensation reaction product may vary widely, if the proportion of the condensation reaction product is excessively small, the adhesive properties decrease and if said proportion is excessively large, the coating films obtained become brittle, and hence the amount of condensation reaction product is usually 0.1–40 parts by weight, preferably 0.5–30 parts by weight, more preferably 1–20 parts by weight based on 100 parts by weight of the fluoropolymer. When the silane compound itself is added to the coating composition, the amount of the silane compound is usually 0.1–50 part by weight, preferably 1–35 parts by weight, particularly 2–25 parts by weight based on 100 parts by weight of the fluoropolymer. If the amount of the silane compound added is less than 0.1 part by weight, no effect of improving adhesive properties is exhibited as expected, and if the amount of the silane compound incorporated exceeds 50 parts by weight, the coating films obtained become undesirably brittle.

When a primer layer is formed on the surface of substrate or base material prior to applying on said surface the fluoropolymer coating composition of the present invention comprising the present fluoropolymer, organic solvent, and optionally metal chelate compound, organic silicate and condensation reaction product, the resulting coating film comes to strongly adhere to the substrate of base material. Such primer layer as mentioned above may be formed by applying on the substrate or base material surface (i) a metal alkoxide solution or (ii) an epoxy resin into which at least 3 parts by weight, based on 100 parts by weight of the epoxy resin, of a silane coupling agent having an epoxy or amino group as an organic functional group, followed by drying or curing.

The metal alkoxides used in the above instance may be those of transition metals, preferably alkoxides of Al, Ti, and Zr, particularly preferred is alkoxide of Ti. Concretely, these are exemplified alkoxides represented by the general formulas $Al(OR^6)_3$, $Zr(OR^6)_4$ and $Ti(OR^6)_4$ wherein $R^6$ is methyl, ethyl, propyl, isopropyl, butyl, isobutyl, sec-butyl, tert-butyl, pentyl, isopentyl, hexyl or 2-ethylhexyl. The metal alkoxide solution is obtained by dissolving the above mentioned metal alkoxide in an organic solvent, and preferred are the metal alkoxide solutions having the metal alkoxide concentration of less than about 2%.

In forming the primer layer by using the metal alkoxide solution, the solution is applied on the surface of substrate or base material, followed by air drying or drying by heating.

As another means for forming the primer layer, there is an epoxy resin incorporated with specific silane coupling agents, that is, the epoxy resin into which at least 3 parts, based on 100 parts by weight of the epoxy resin, of the silane coupling agent having an epoxy or amino group as an organic functional group. As the silane coupling agents mentioned above, there may be exemplified γ-glyxidoxypropyl trimethoxysilane, β-(3,4-epoxycyclohexyl)ethyl trimethoxysilane, γ-aminopropyl triethoxysilane, N-(β-aminoethyl)-γ-aminopropyl trimethoxysilane and N-(β-aminoethyl)-γ-aminopropylmethyl dimethoxysilane. The epoxy resin may include various resins publicly known as epoxy resins, and the silane coupling agent is incorporated into the epoxy resin in an amount of at least 3 parts, preferably at least 8 parts by weight based on 100 parts by weight of the epoxy resin. If the amount of the silane coupling agent is less than 3 parts by weight, the adhesion to the fluoropolymer becomes poor and the epoxy resin comes to be unable to function as the primer layer. In forming the primer layer using the epoxy resin, a mixture of the epoxy resin and known hardener for epoxy resin is applied on the surface of substrate or base material and allowed to undergo crosslinking reaction, whereby the epoxy resin is cured.

The fluoropolymer coating materials of the present invention comprising such components as mentioned hereinbefore may be further incorporated, if necessary, with silanol condensation catalysts in order to accelerate the curing reaction thereof. The silanol catalyst used in the coating materials have a function to freely adjust the curing rate of the coating materials by altering the kind and amount of the silanol catalyst used.

Usable silanol catalysts are those publicly known, for example, metal salts of carboxylic acids such as dibutyl tin dilaurate, stannous acetate, stannous octanoate, lead naphthenate, iron 2-ethylhexanoate and cobalt naphthenate, organic bases, for example, ethylamine, hexylamine, dibutylamine and piperidine; mineral acids and organic fatty acids. Appropriate silanol catalysts are alkyl tin salts of carboxylic acid, for example, dibutyl tin dilaurate, dibutyl tin octoate and dibutyl tin diacetate.

If the silanol catalysts are used in excessively large amount, the resulting coating films decrease in adhesive property to the surface of substrate or base material, and hence the catalysts are desirably used in an amount of 0–10 parts by weight, preferably 0.005 5 parts by weight based on 100 parts by weight of the fluoropolymer.

The fluoropolymer coating compositions of the present invention are applied in the same manner as in ordinary liquid coating materials on the surface of metal, wood, plastics, ceramics, paper and glass with blush, spray or roller coater. The coating films of the present fluoropolymer coating compositions, after curing, are excellent in weathering resistance, chemical resistance, solvent resistance, water resistance, heat resistance, low friction characteristics as well as in tansparency and gloss. Furthermore, the present fluoropolymer coating compositions may be incorporated with pigments such as $TiO_2$ and dyes to formulate into colored coating materials and also may be incorporated with various kinds of additives commonly used in synthetic resins, if necessary.

While the present invention will be illustrated by suitable examples, the present invention is not limited thereto unless otherwise indicated. Any change in embodiments can be made in the scope which does not impair the objects of the present invention. All percentages, parts and ratios used herein are by weight unless otherwise indicated.

EXAMPLE 1

A 300 cc autoclave equipped with a stainless steel stirrer was charged with 80 grams of benzene, 25.2 grams of butyl vinyl ether (BVE), 7.1 grams of trimethoxyvinylsilane (TMVS) and 1 gram of lauroyl peroxide. The solidification and degassing were carried out by acetone and dry ice to remove oxygen in the system. Thereafter, 45 grams of hexafluoropropene (HFP) was introduced into the autoclave and the temperature was raised. When the temperature of the contents in the autoclave reached 65° C., the pressure was 8.1 kg/cm$^2$. The reaction was continued for 8 hours with stirring. When the pressure reached 4.6 kg/cm$^2$, the autoclave was cooled with water to stop the reaction. After cooling, the unreacted monomer was expelled, and the autoclave was opened. The reaction mixture was removed from the autoclave. After concentration, the reaction mixture was washed with a mixture of benzene and methanol. The reconcentration and drying were carried out. The yield of the polymer was 60 grams.

The number average molecular weight of the resulting polymer (by GPC) was $1.0 \times 10^4$ and its glass transition temperature was $-14°$ C.

According to the analysis of the copolymer using elementary analysis and NMR, the molar ratio of HEP/BVE/TMVS was found to be 48/40/12.

Five grams of the present polymer was dissolved in 5 grams of toluene, and $3.2 \times 10^{-3}$ gram of dibutyl tin dilaurate (DBTDL) was added to the solution to prepare a coating composition. This coating composition was applied to a soft steel plate having a epoxy primer by means of an applicator. The coating film was cured for 14 days at room temperature and the physical properties of the coating film were examined. The results are shown in. Table 1.

When a glass plate having the coating composition applied thereto (the glass plate has an epoxy primer) was immersed in a 10% sulfuric acid, 10% hydrochloric acid, 10% acetic acid or 10% sodium hydroxide solution, no change was observed even after two weeks.

On the other hand, the light transmittance of the cured film having a thickness of 45μ was 99.6%. The 60—60 specular reflection of the coated steel plate was 86.8%.

A coating composition comprising 100 parts of the present polymer, 50 parts of $TiO_2$, 100 parts of toluene, and 0. 16 part of dibutyl tin dilaurate was applied to a steel plate to which an epoxy primer had been applied, and cured for 10 days at room temperature. The 60°—60° specular retention when the coated steel plate was placed in a sunshine weathermeter (the temperature of a black panel: 63° C.) for 800 hours was 99.6%. The color difference (DE) was 0.51.

TABLE 1

| Test Items | |
|---|---|
| Cross-cut Cello Tape adhesion test[*1] | 100/100 |
| Acetrene/toluene immersion (24 hr.) | No change |
| Pencil hardness[*2] | F |
| Bending properties[*3] | It withstands 2 mm in diameter. |
| Contact angle between it and water | 94 |

TABLE 1-continued

| Test Items | |
|---|---|
| Static friction coefficient*4 | 0.53 |

*1 A cut was made to the film surface of the coating film coated on a steel plate according to "JIS K 5400 1979, General Method of testing a Coating Composition 6.15 Cross-Cut Adhesion Test". A cellophane adhesive tape having a width of 20 mm was then placed on the coating film surface of the cross-cut portions. The tape was bonded to the coating film surface while strongly rubbing it with a spatula having a width of 7 mm. The cellophane tape was rapidly and perpendicularly pulled up to peel off from the coating film surface. The bonding and peeling of the cellophane tape were carried out from four times (total) from each direction of four sides of the cross-cut portions. The numbers of the cross-cut portions leaved intact condition were calculated and the results were expressed in terms of the numbers.
*2 The coating film after curing (the coating composition was allowed to stand for 14 days after application) was measured according to JIS K 5400 (1979) 6.14.
*3 The coating film after curing (the coating composition was allowed to satnd for 14 days after application) was measured according to JIS K 5400 (1979) 6.16.
*4 The static friction coefficient was determined as follows: a 3 cm × 3 cm piece was cut from a steel plate which had been coated with cured fluoropolymer coating composition; the piece was placed on a steel plate having the same cured coating composition such that the coating film surface contact; a 145 g weight was mounted on the piece and one edge of the steel plate was lifted up; and the inclination angle ($\theta$) when the piece began to slipdown was dtermined. The obtained tan $\theta$ was a static friction coefficient.

EXAMPLE 2

The synthesis of another copolymer was carried out in the same conditions as those described in Example 1 wherein haxafluoropropene was replaced with chlorotrifluoroethylene (CTFE).

When the obtained copolymer was analyzed, the content of TMVS was 9 mole %. Further, the molecular weight was 7×10⁴, and the Tg was 0 C.

A coating composition containing the copolymer was applied to a steel plate. The coating composition has the same formulation as described in Example 1. The physical properties of the coated steel plate are shown in Table 2.

TABLE 2

| Test Items | |
|---|---|
| Cross-cut Cello-Tape adhesion test | 100/100 |
| Acetone/toluene immersion (24 hr.) | No change |
| Pencil hardness | H |
| Contact angle between product and water | 82 |
| Static friction coefficient | 0.48 |

EXAMPLES 3-13

The polymerization was carried out in the same manner as described in Example 1, and the physical properties of the resulting copolymer are shown in Table 3.

An epoxy primer was applied to a steel plate. A suitable amount of DBTDL was added to a toluene solution of each copolymer to prepare a coating composition. This coating composition was applied to form a coating film to the steel plate having the primer. The coating film was cured for two weeks at room temperature. The physical properties are shwon in Table 3. Table 3 also showed the results of Examples 1 and 2.

| | Composition of monomers (molar ratio) | | | | | | | | | |
|---|---|---|---|---|---|---|---|---|---|---|
| | Component (a) | | Component (b) | | | Component (c) | | | | |
| Example | HFP | CTFE | BVE | EVE | CyHVE | TMVS | TEVS | DEMVS | DEDVS | TMVPS |
| 1 | 48 | | 40 | | | 12 | | | | |
| 2 | | 51 | 40 | | | 9 | | | | |
| 3 | 50 | | 35 | | | 15 | | | | |
| 4 | 50 | | | 40 | | 10 | | | | |
| 5 | 40 | | | 45 | | 15 | | | | |
| 6 | 50 | | 40 | | | | 10 | | | |
| 7 | 50 | | 40 | | | | | 10 | | |
| 8 | 50 | | 30 | | | | | 20 | | |
| 9 | 50 | | 45 | | | | | | 5 | |
| 10 | 50 | | 40 | | | | | | 10 | |
| 11 | | 60 | 25 | | 5 | 10 | | | | |
| 12 | 50 | | 40 | | | | | | | 10 |
| 13 | 50 | | 30 | | | | | | | 20 |

| | physical properties of copolymers | | Physical properties of cured film | | | | |
|---|---|---|---|---|---|---|---|
| | | | Cross-cut cello-Tape adhesion | Pencil hard- | Acid/alkali | Friction coefficient | Contact Angle |
| Example | $\overline{Mn}$ (X10⁻⁴) | Tg (°C.) | test | ness | resistance | (tan $\theta$) | ($\theta$) |
| 1 | 1.0 | −14 | 100/100 | F | Good | 0.53 | 94 |
| 2 | 7.0 | 0 | 100/100 | H | Good | 0.48 | 82 |
| 3 | 0.8 | −16 | 100/100 | F | Good | 0.45 | 94 |
| 4 | 1.3 | −3 | 100/100 | F | Good | 0.49 | 93 |
| 5 | 1.0 | −21 | 100/100 | F | Good | 0.46 | 90 |
| 6 | 1.1 | −34 | 100/100 | F | Good | 0.36 | 90 |
| 7 | 1.1 | −18 | 100/100 | F | Good | 0.40 | 93 |
| 8 | 0.6 | −21 | 100/100 | F | Good | 0.38 | 90 |
| 9 | 3.3 | −34 | 100/100 | HB | Good | 0.46 | 78 |
| 10 | 2.0 | −38 | 100/100 | F | Good | 0.40 | 75 |
| 11 | 3.2 | −10 | 100/100 | F | Good | 0.31 | 86 |
| 12 | 8.4 | −14 | 100/100 | F | Good | 0.41 | 92 |
| 13 | 8.1 | −16 | 100/100 | HB | Good | 0.32 | 92 |

Abbreviation:
EVE = ethyl vinyl ether;
TEVS = triethoxyvinylsilane;
DEDVS = diethoxydivinylsilane;
CyHVE = cyclohexyl vinyl ether;
DEMVS = diethoxymethylvinylsilane:
TMVPS = trimethoxyvinyloxypropylsilane

EXAMPLE 14

A 300 cc autoclave equipped with a stainless steel stirrer was charged with 80 grams of benzene, 14.7 grams of ethyl vinyl ether (EVE), 3 grams of butyl vinyl ether (BVE), 8.8 grams of trimethoxyvinylsilane (TMVS) and 1 gram of lauroyl peroxide. The solidification and degassing were carried out by acetone and dry ice to remove oxygen in the system. Thereafter, 47 grams of hexafluoropropene (HFP) was introduced into the autoclave and the temperature was raised. When the temperature of the contents in the autoclave reached 65° C., the pressure was 8.1 kg/cm². The reaction was continued for 8 hours with stirring. When the pressure reached 4.6 kg/cm², the autoclave was cooled with water to stop the reaction. After cooling, the unreacted monomer was expelled, and the autoclave was opened. The reaction mixture was removed from the autoclave. After concentration, the reaction mixture was washed with a mixture of benzene and methanol. The reconcentration and drying were carried out.

The number average molecular wieght of the resulting polymer (by GPC) was $8 \times 10^3$.

According to the analysis of the copolymer using elementary analysis and NMR, the molar ratio of HFP/EVE/BVE/TMBVS was found to be 50/35/5/10.

The polymerization was carried out in the same manner as described above except that type and amount of the monomers were varied. The results are shown in Table 4.

TABLE 4

| Experimental Example | Composition of Monomers (molar ratio) | | | | | | | Mn ($\times 10^4$) |
|---|---|---|---|---|---|---|---|---|
| | Component (a) | | Component (b) | | | Component (c) | | |
| | HFP | CTFE | BVE | EVE | CyHVE | TMVS | DEMVS | |
| 1 | 50 | | 5 | 35 | | 10 | | 0.8 |
| 2 | 50 | | 45 | | | 5 | | 1.1 |
| 3 | 50 | | 5 | 35 | | 10 | | 1.7 |
| 4 | 40 | | 20 | 30 | | | 10 | 1.2 |
| 5 | | 50 | 5 | 35 | | 10 | | 1.8 |
| 6 | | 60 | | 28 | 3 | 15 | | 1.8 |

CTFE = chlorotrifluoroetgylene;
CyHVE = cyclohexyl vinyl ether;
DEMVS = diethoxymethylvinylsilane

EXAMPLE 15

A 70% butanol solution of dibutoxytitanium bisoctylene glycolate (Orgatics® TC 200, manufactured by Matsumoto Sieyaku, Japan) in an amount shown in Table 5 and 100 parts of toluene were added to 100 parts of the fluorine-containing polymer obtained in Experimental Number 1 of Example 14, and mixed with stirring to obtain a fluoropolymer coating composition. The composition was then applied to a steel plate using an applicatior to form a coating film of 50μ (50μ applicator), and allowed to stand for 7 days at room temperature. Thereafter, the cross-cut adhesion test, the acetone immersion test (24 hours), the toluene immersion test (24 hours), and the pencil hardness test (JIS K 5400-1979, 6.14) were carried out. The results are shown in Table 5.

TABLE 5

| Amount of titanium chelate component used (parts) | 0 | 5 | 10 | 30 | 55 |
|---|---|---|---|---|---|
| Cross-cut adhesion test | 0/100 | 100/100 | 100/100 | 100/100 | 100/100 |
| Acetone immersion | — | No change | No change | No change | No change |
| Toluene immersion | — | Partial peeling | No change | No change | No change |
| Pencil hardness | — | HB | HB | HB | HB |

EXAMPLE 16

Example 15 was repeated except that the titanium chelate compound of Example 15 was replaced with a 75% isopropanol solution of diisopropoxy-titanium acetyl acetonate (Orgatics® TC 100, manufactured by Matsumoto Seiyaku, Japan). The results are shown in Table 6.

TABLE 6

| Amount of titanium chelate component used (parts) | 10 | 20 | 40 |
|---|---|---|---|
| Cross-cut adhesion test | 50/100 | 70/100 | 100/100 |
| Acetone immersion | No change | No change | No change |
| Toluene immersion | No change | No change | No change |
| Pencil hardness | HB | HB | HB |

EXAMPLE 17

The coating composition used in Example 15 was applied to a steel plate with a different thickness, and cured for 7 days at room temperature. The cross-cut adhesion test was carried out. The results are shown in Table 7.

The amount of the titanium chelate compound used was 30 parts.

TABLE 7

| Film thickness after drying (μ) | 5 | 12 | 23 | 30 |
|---|---|---|---|---|
| Cross-cut adhesion test | 100/100 | 100/100 | 56/100 | 14/100 |

EXAMPLE 18

Tests were carried out in the same manner as described in Example 15 except that the titanium chelate compound of Example 15 was replaced with a 75% butanol solution of acetylacetonezirconium butoxide. The results are shown in Table 8.

TABLE 8

| Amount of Zr chelate component used (parts) | 10 | 25 | 50 |
|---|---|---|---|
| Cross-cut adhesion test | 100/100 | 100/100 | 100/100 |
| Acetone immersion | No change | No change | No change |
| Toluene immersion | No change | No change | No change |

EXAMPLE 19

Tests were carried out in the same manner as described in Example 15 except that the titanium chelate compound of Example 15 was replaced with 10 parts of aluminum di-n-butoxide-monoethyl acetate. No peeling was observed in the cross-cut adhesion test.

EXAMPLES 20-24

Twenty five parts of a 70% butanol solution of dibutoxytitanium bis-octylene glycolate and 100 parts of toluene were added to 100 parts of each of the fluorine-containing polymers of Experimental Numbers 2-6 of Example 14 to obtain fluoropolymer coating compositions. The subsequent steps were carried out in the same manner as described in Example 15. The results are shown in Table 9.

TABLE 9

| | Example 20 | Example 21 | Example 22 | Example 23 | Example 24 |
|---|---|---|---|---|---|
| Type of fluorine-containing polymers | Experimental Number 2 of Example 14 | Experimental Number 3 of Example 14 | Experimental Number 4 of Example 14 | Experimental Number 5 of Example 14 | Experimental Number 6 of Example 14 |
| Cross-cut adhesion test | 100/100 | 100/100 | 100/100 | 100/100 | 100/100 |

EXAMPLE 25

A coating composition comprising 100 parts of a fluorine-containing copolymer consisting of 50 mole % of chlorotrifluoroethylene, 25 mole % of ethyl vinyl ether, 15 mole % of cychohexyl vinyl ether and 10 mole % γ-hydroxybutyl vinyl ether (the copolymer's intrinsic viscosity [η] was about 0.4 dl/g as measured in tetrahydrofuran at 30° C.), 100 parts of xylene, and 15 parts of Orgatics ® TC 100, was applied and cured in the same manner as described in Example 15. In the cured coating film, no peeling was observed in the cross-cut adhesion test, the acetone immersion test and the toluene immersion test.

EXAMPLE 26

A 300 ml autoclave equipped with a stainless steel stirrer was charged with benzene, ethyl vinyl ether (EVE), butyl vinyl ether (BVE), trimethoxyvinylsilane (TMVS) and lauroyl peroxide. The solidification and degassing were carried out by acetone and dry ice to remove oxygen in the system. Thereafter, chlorotrifluoroethylene (CTFE) was introduced into the autoclave and the temperature was raised. When the temperature of the contents in the autoclave reached 65° C., the pressure was 4.1 kg/cm². The reaction was continued for 8 hours with stirring. When the pressure reached 1.3 kg/cm², the autoclave was cooled with water to stop the reaction. After cooling, the unreacted monomer was expelled, and the autoclave was opened. The reaction mixture was removed from the autoclave. After concentration, the reaction mixture washed with a mixture of benzene and methanol. The reconcentration and drying were carried out.

The number average molecular weight of the resulting polymer (A-1) (by GPC) was 8,500.

According to the analysis of the composition of the copolymer using elementary analysis and NMR, the molar ratio of CTFE/EVE/BVE/TMVS was bound to be 48/38/7/7.

Various copolymers were obtained in the same manner as described above. The composition and physical properties of the resulting copolymers are shown in Table 10.

TABLE 10

| Experiment number | Component (a) | | Component (b) | | | Component (c) | | | Molecular Weight (Mn) |
|---|---|---|---|---|---|---|---|---|---|
| | CTFE | HFP | EVE | BVE | CyHVE | VITM | MVDSMS | VPTMS | |
| A-1 | 48 | | 38 | 7 | | 7 | | | 8,500 |
| A-2 | | 50 | 35 | 5 | | 10 | | | 7,000 |
| A-3 | 51 | | 37 | | 8 | 4 | | | 13,000 |
| A-4 | 48 | | 37 | 7 | | | 8 | | 11,000 |
| A-5 | 51 | | 15 | 14 | | | | 20 | 50,000 |

Abbreviation:
CTFE = chlorotrifluoroethylene;
EVE = ethyl vinyl ether;
CyHVE = cyclohexyl vinyl ether;
MVDMS = methylvinyldimethoxysilane;
HEP = hexafluropropene;
BVE = butyl vinyl ether;
VTMS = vinyltrimethoxysilane;
VPTMS = vinyloxypropyltrimethoxysilane

REFERENCE EXAMPLE 1

Production of a Condensation Product of a Silane Compound and an Epoxy Group-Containing Alcohol.

A 300 ml reaction vessel equipped with a stirrer was charged with 60.8 grams of tetramethyl orthosilicate (4 MS), 59.3 grams of glycidol, and 1.2 gram of a 6.3% toluene solution of dibutyl tin dilaurate. The reaction was carried out for one hour at a temperature of 65° C. in N₂ stream. Thereafter, the temperature was raised to 80° C., and methanol which was a reaction by-product was distilled off for 3 hours to obtain a condensate B-1.

Various condensates were obtained in the same manner as described above. The composition of the resulting condensates in shown in Table 11.

TABLE 11

| Experiment No. | Amount of condensation reaction starting materials charged | | | | | | Molar ratio of (e) to (d) |
|---|---|---|---|---|---|---|---|
| | Component (d) (g) | | | Component (e) (g) | | | |
| | 4MS | M3MS | PMS | GL | TMPGE | GPGE | |
| B-1 | 60.8 | | | 59.3 | | | 2 |
| B-2 | 60.8 | | | 89.0 | | | 3 |
| B-3 | 15.2 | | | | 61.5 | | 1.2 |
| B-4 | 30.4 | | | | | 48 | 1.2 |
| B-5 | | 40.9 | | 22.2 | | | 1 |
| B-6 | | | 57.6 | 7.4 | | | 1 |

TABLE 11-continued

| Experiment No. | Amount of condensation reaction starting materials charged | | | | | | Molar ratio of (e) to (d) |
|---|---|---|---|---|---|---|---|
| | Component (d) (g) | | | Component (e) (g) | | | |
| | 4MS | M3MS | PMS | GL | TMPGE | GPGE | |
| B-7 | | | 57.6 | 14.8 | | | 2 |

Abbreviation:
4MS = tetramethyl orthosilicate;
M3MS = methyltrimethoxysilane;
PMS = partially hydrolyzed product of tetramethyl orthosilicate, Methyl Silicate 51 (manufactured by Colcoat) represented by

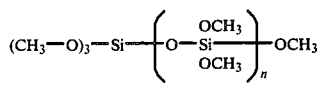

(wherein n is 4 on the average);
GL = glycidol;
TMPGE = trimethylolpropane polyglycidyl ether, SR-TMP (manufactured by Sakamoto Yakuhin Kogyo); and
GPGE = glycerin polyglycidyl ether

EXAMPLE 27

0, 5, or 10 parts of the condensation product of Experiment NO. B-1 of Example 26 were incorporated into a solution comprising 100 parts of the fluorine-containing polymer of Experiment A-1 of Example 26, 33 parts of toluene and 33 parts of xylene. Then 2.5 parts of a 6.3% solution of dibutyl tin dilaurate were added to the mixtures to prepare a coating compositions.

The coating compositions were than applied to a steel plate in the following methods (i) and (ii) described hereinafter and cured for 10 days at room temperature. Various tests were carried out.
(i) The coating composition was directly applied on a steel plate using a 100μ applicator.
An epoxy coating composition (Epomarine HB, manufactured by KANSAI PAINT CO., LTD., Japan) was previously applied on a steel plate using a 75μ applicator, and cured for 2 days at room temperature. The coating composion described above was applied on the primer film of the epoxy coating composition using a 150μ applicator.
The results are shown in Table 12.

TABLE 12

| Amount of B-1 used (parts) | Coating on steel plate | | | Coating on epoxy film | | |
|---|---|---|---|---|---|---|
| | 0 | 5 | 10 | 0 | 5 | 10 |
| Cross-cut adhesion test | 0/100 | 100/100 | 100/100 | 0/100 | 65/100 | 85/100 |
| Acetone immersion | — | No change | No change | — | No change | No change |
| Toluene immersion | — | No change | No change | — | Partial peeling | No change |
| Pencil hardness | — | B | B | — | B | B |
| Bending properties | — | 2 mm in diameter | 2 mm in diameter | — | 3 mm in diameter | 2 mm in diameter |
| Static friction coefficient | 0.43 | 0.45 | 0.46 | 0.43 | 0.47 | 0.45 |

EXAMPLE 28

2.5 parts of Methyl Silicate 51 were further incorporated into the coating composition of Example 27. The amount of the condensation product B-1 used was 2, 5, 10 or 20 parts. The same tests as those of Example 27 were carried out.
The results are shown in Table 13.

TABLE 13

| Amount of B-1 used (parts) | Coating on steel plate | | | | Coating on epoxy film | | | |
|---|---|---|---|---|---|---|---|---|
| | 2 | 5 | 10 | 20 | 2 | 5 | 10 | 20 |
| Cross-cut adhesion test | 100/100 | 100/100 | 100/100 | 100/100 | 100/100 | 100/100 | 100/100 | 100/100 |
| Acetone immersion | No Change | No Change | No Change | No Change | No Change | No Change | No Change | No Change |
| Toluene immersion | No Change | No Change | No Change | No Change | No Change | No Change | No Change | No Change |
| Pencil hardness | B | B | B | B | B | B | B | B |
| Bending properties | 2 mm in diameter | 2 mm in diameter | 2 mm in diameter | 2 mm in diameter | 2 mm in diameter | 2 mm in diameter | 2 mm in diameter | 2 mm in diameter |
| Static friction coefficient | — | 0.41 | — | — | — | 0.45 | — | — |

EXAMPLE 29

Example 28 was repeated except that the amount of Methyl Silicate 51 of Example 28 was 10 parts or 15 parts. The results obtained were the same as those of Example 28.

EXAMPLE 30

Titanium oxide (CR-90, manufactured by ISHIHARA SANGYO KAISHA, LTD., Japan) was incorporated into the coating composition of Example 28 in an amount of 50% as a pigment, and the same tests as those described in Example 28 were carried out. This colored fluorine-containing coating composition provided the same results as those of Example 28.

EXAMPLE 31

Five parts of the condensation product of Experiment No. B-2 of Reference Example 1 was incorporated into a solution comprising 100 parts of the fluorine-containing polymer of Experiment No. A-1 of Example 26, 33 parts of toluene, 33 parts of xylene, 10 parts of Methyl Silicate 51 and 0.15 part of dibutyltin dilaurate to prepare a coating composition.

This coating composition was applied on the steel plate and the epoxy film formed on the steel plate, and cured for 10 days at room temperature in the same manner as described in Example 28. When the cross-cut adhesion test was carried out, no peeling was observed.

EXAMPLE 32

Ten parts of the condensation product of Experiment No. B-1 of Reference Example 1 was incorporated into a solution comprising 100 parts of the fluorine-containing polymer of Experiment No. A-2 of Example 26, 33 parts of toluene, 33 parts of xylene, 5 parts of Methyl Silicate 51 and 0.15 part of dibutyl tin dilaurate to prepare a coating composition.

This coating composition was applied on the steel plate and the epoxy film formed on the steel plate in the same manner as described in Example 27, and cured for 10 days at room temperature. When the cross-cut adhesion test was carried out, no peeling was observed.

EXAMPLE 33

100 parts of the fluorine-containing polymer of Experiment No. A-1 of Example of 26, 33 parts of toluene, 33 parts of xylene, 5 parts of Methyl Silicate 51, 10 parts of the condensation product of Experiment No. B-3 of Reference Example 1 and 0.76 part of a 6.3% toluene solution of dibutyl tin dilaurate were mixed to obtain a coating composition.

This coating composition was used to carry out the same tests as those of Example 31. As a result, in both coating films formed on the steel plate and on the epoxy film, no peeling was observed.

The above coating composition excluding the condensation product was applied on the epoxy film and tested in the same manner as described above. As a result, the all coating films were peeled off. Further, coating films containing -glycidoxypropyl-trimethylsilane in place of the condensation product were completely peeled off.

EXAMPLE 34

Example 33 was repeated except that the condensation product B-3 of Example 33 was replaced with the condensation product B-4 of Reference Example 1. The results obtained were the same as those of Example 33, and no peeling was observed.

EXAMPLE 35

Example 33 was repeated except that the condensation product B-3 of Example 33 was replaced with the condensation product B-5 of Reference Example 1 and the amount of the condensation product B-5 was 5 or 10 parts. As a result, in both cases, no peeling was observed.

EXAMPLE 36

There was prepared a coating composition comprising 100 parts of the fluorine-containing polymer of Experiment No. A-1 of Example 26, 15 parts of the condensation product of Experiment No. B-6 of Reference Example 1, 5 parts of tetramethyl orthosilicate, 33 parts of toluene, 33 parts of xylene and 3 parts of a 6.3% toluene solution of dibutyl tin dilaurate.

An epoxy coating composition (Eton No. 2100, manufactured by Kawakami Toryo, Japan) was preiously applied on a steel plate using a 75 applicator and cured for 2 days at room temperature. Thereafter, the fluorine-containing coating composition described above was applied on the epoxy film thus formed using a 150μ applicator, and cured for 10 days at room temperature. The results of the cross-cut adhesion test were good, and no peeling was observed.

When the fluorine-containing coating composition was directly applied on the steel plate, no peeling was also observed.

EXAMPLE 37

Example 36 was repeated except that the condensation product B-6 of Example 36 was replaced with the condensation product B-7 of Reference Example 1 and the amount of the condensation product B-7 used was 5 parts. As a result, no peeling was observed.

EXAMPLE 38

100 parts of the fluorine-containing polymer of Experiment No. A-3 Example 26, 10 parts of the condensation product of Experiment No. B-1 of Reference Example 1, 7 parts of tetramethyl orthosilicate, 3 parts of tetraethyl orthosilicate, 5 parts of a 6.3% toluene solution of dibutyltin dilaurate, 33 parts of toluene and 33 parts of xylene were mixed to prepare a coating composition.

This coating composition was applied on the steel plate and on the epoxy film in the same manner as described in Example 27, and cured for 10 days at room temperature. When the cross-cut adhesion test was carried out, in both cases, no peeling was observed.

EXAMPLE 39

100 parts of the fluorine-containing polymer of Experiment No. A-4 of Example 26, 5 parts of the condensation product of Experiment No. B-1 of Reference Example 1, 5 parts of methyltrimethoxysilane, 2.5 parts of a 6.3% toluene solution of dibutyl tin dilaurate, 33 parts of toluene and 33 parts of xylene were mixed to prepare a coating composition.

When the resulting coating composition was used to carry out the same tests as those of Example 38, no peeling was observed.

EXAMPLE 40

100 parts of the fluorine-containing polymer of Experiment No. A-5 of Example 26, 5 parts of the condensation product of Experiment No. B-1 of Reference Example 1, 5 parts of Methyl Silicate 51, 5 parts of a 6.3% toluene solution of dibutyl tin dilaurate, 33 parts of toluene and 33 parts of xylene were mixed to prepare a coating composition.

When this coating composition was used to carry out the same tests as those of Example 38, no peeling was observed.

EXAMPLE 41

A 300 cc autoclave equipped with a stainless steel stirrer was charged with 80 grams of benzene, 8.2 grams of ethyl vinyl ether (EVE), 12.6 grams of butyl vinyl ether (BVE), 8.0 grams of trimethoxyvinylsilane (TMVS) and 1 gram of lauroyl peroxide. The solidification and degassing were carried out by acctone and dry ice to remove oxygen in the system. Thereafter, 46 grams of hexafluoropropene (HEP) was introduced into the autoclave and the temperature was raised. When the temperature of the contents in the autoclave reached 65° C., the pressure was 8.1 kg/cm$^2$. The reaction was continued for 8 hours with stirring. When the pressure reached 4.6 kg/cm$^2$, the autoclave was cooled with water to stop the reaction. After cooling, the unreacted monomer was expelled, and the autoclave was opened. The reaction mixture was removed from the autoclave. After concentration, the reaction mixture was washed with a mixture of benzene and methanol. The reconcentration and drying were carried out. The yield of the polymer was 60 grams.

The number average molecular weight of the resulting polymer (by GPC) was $8 \times 10^3$.

According to the analysis of the polymer using elementary analysis and NMR, the molar ratio of HEP-/EVE/BVE/TMVS was found to be 50/20/20/10. (Experimental Example 1)

The type and amount of the monomers were changed to obtain the following two polymers.

Experimental Example 2

CTFE/EVE/CyHVE/TMVS=50/30/10/10/ (molar ratio)
$Mn = 2 \times 10^4$

Experimental Example 3

HFP/EVE/BVE/TEVS*=40/35/10/15 (molar ratio)
$Mn = 6 \times 10^3$

*CTFE=monochlorotrifluoroethylene; CyHVE=cyclohexyl vinyl ether; and TEVS=triethoxyvinylsilane

EXAMPLE 42

Methyl Silicate 51 (manufactured by Colcoat) and dibutyl tin dilaurate were incorporated into 100 parts of the fluorine-containing polymer of Experimental Example 1 of Example 41 in amounts indicated in Table 14. Then, 67 parts of toluene was incorporated therein to obtain a coating composition. The composition was then applied to a steel plate using a 100μ applicator, and allowed to stand for 10 days at room temperature. The following various tests were carried out. The results are shown in Table 14. Even if the coating composition was allowed to stand for 2 hours in air, no skinning phenomenon was observed on the surface of the coating compositon.

TABLE 14

| Amount of Methyl silicate 51 used (parts) | 2 | 5 | 10 | 20 |
|---|---|---|---|---|
| Amount of dibutyl tin dilaurate used (parts) | 0.06 | 0.06 | 0.1 | 0.1 |
| Cross-cut adhesion test | 100/100 | 100/100 | 100/100 | 100/100 |
| Acetone immersion | Partial Peeling | No Change | No Change | No Change |
| Toluene immersion | Partial Peeling | No Change | No Change | No Change |
| Pencil hardness | HB | HB | HB | HB |
| Du pont impact | — | At least 50 cm | At least 50 cm | At least 50 cm |

EXAMPLE 43

Tests were carried out in the same manner as described in Example 42 except that Methyl Silicate 51 of Example 42 was replaced with a mixture of Methyl Silicate 51 and tetramethyl orthosilicate at a weight ratio of 1:1. The same results were obtained.

EXAMPLE 44

The type of the applicator of Example 42 was changed and the film thickness was changed to carry out the tests. There are no differences in the results due to the film thickness. The results are shown in Table 15.

TABLE 15

| Film thickness after drying (μ) | 6 | 11 | 22 | 30 |
|---|---|---|---|---|
| Cross-cut adhesion test | 100/100 | 100/100 | 100/100 | 100/100 |
| Acetone immersion | No Change | No Change | No Change | No Change |
| Toluene immersion | No Change | No Change | No Change | No Change |

EXAMPLE 45

A coating composition comprising 100 parts of the polymer of Experimental Example 2 of Example 41, 5 parts of Methyl Silicate 51 (manufactured by Colcoat), 67 parts of toluene, and 0.06 part of dibutyl tin dilaurate was applied and cured in the same manner as described in Example 42. The results are shown in Table 16.

TABLE 16

| Cross-cut adhesion test | 100/100 |
|---|---|
| Acetone immersion | No change |
| Toluene immersion | No change |
| Pencil hardness | H |
| 60 - 60 Specular reflection | 82 |

The addition of Methyl Silicate 51 did not affect the tensile strength, tear strength, and 60°—60° specular reflection of the film.

EXAMPLE 46

A coating composition comprising 100 parts of the polymer of Experimental Example 3 of Example 41, 3 parts of Ethyl Silicate 40 (manufactured by Colcoat), 3 parts of Ethyl Silicate 28 (manufactured by Colcoat) and 0.6 part of dibutyl tin dilaurate was applied to a steel plate using a 100 applicator, and cured for 10 days at room temperature. The results are shown in Table 17.

Ethyl Silicate 28 is represented by $(C_2H_5—O)_3—Si—OC_2H_5$ and Ethyl Silicate 40 is represented by

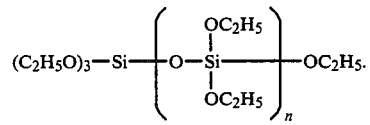

TABLE 17

| Cross-cut adhesion test | 100/100 |
|---|---|
| Acetone immersion | No change |
| Toluene immersion | No change |

EXAMPLE 47

A 300 cc autoclave equipped with a stainless steel stirrer was charged with 80 grams of benzene, 25.2 grams of ethyl vinyl ether (EVE), 7.1 grams of trimethoxyvinylsilane (TMVS) and 1 gram of lauroyl peroxide. The solidification and degassing were carried out by acetone and dry ice to remove oxygen in the system. Thereafter, 45 grams of hexafluoropropene (HFP) was introduced into the autoclave and the temperature was raised. When the temperature of the contents of the autoclave reached 65° C., the pressure was 8.1 kg/cm$^2$. The reaction was continued for 8 hours with stirring. When the pressure reached 4.6 kg/cm$^2$, the autoclave was cooled with water to stop the reaction. After cooling, the unreacted monomer was expelled, and the autoclave was opened. The reaction mixture was removed from the autoclave. After concentration, the reaction mixture was washed with a mixture of benzene and methanol. The reconcentration and drying were carried out.

The number average molecular weight of the resulting polymar (by GPC) was $0.7 \times 10^4$.

According to the analysis of the copolymer using elementary analysis and NMR, the molar ratio of HEP/EVE/TMVS was found to be 48/40/12.

EXAMPLE 48

A 1% toluene solution of tetrabutoxy titanium (a primer) was applied to a steel plate using a 50μ applicator, and allowed to stand for 0-24 hours at room temperature. A coating composition comprising 100 parts of the fluorine-containing polymer of Example 47, 66 parts of toluene, and 0.3 part of dibutyl tin dilaurate was applied onto the primer using a 100 applicator. The film thickness after drying was 22μ.

After coating composition was cured for 10 days at room temperature, the cross-cut adhesion test, the acetone immersion test (24 hours), and the toluene immersion test (24 hours) were carried out. The results are shown in Table 18.

TABLE 18

|  | No primer | Standing time after primer application (hr.) | | | |
|---|---|---|---|---|---|
|  |  | 0 | 2 | 6 | 24 |
| Cross-cut adhesion test | 0/100 | 100/100 | 100/100 | 100/100 | 100/100 |
| Acetone immersion | — | No change | No change | No change | No change |
| Toluene immersion | — | Partial peeling | No change | No change | No change |

EXAMPLE 49

Dibutyl tin dilaurate of Example 48 was replaced with 11 parts of a 70% butanol solution of n-butoxytitanium bis-octyleneglycolate (Orgatics® TC 200, manufactured by Matsumoto Seiyaku, Japan). After the primer was applied, a resin solution was applied onto the primer for 2 hours. As a result, the cross-pcut adhesion test provided 100/100, and no peeling of the coating films was observed by both the acetone immersion test and the toluene immersion test.

EXAMPLE 50

Example 48 was repeated except that the 1% toluene solution of tetrabutoxytitanium was replaced with a 1% toluene solution of tetrabutoxyzirconium, and that after the primer was applied to the steel plate, it was allowed to stand for 4 hours. As a result, the cross-cut adhesion test provided 100/100, and no peeling of the coating films was observed by both the acetone immersion test and the toluene immersion test.

EXAMPLE 51

A solution comprising 100 parts of an epoxy resin EPOMIC® (manufactured by Mitsui Petrochemical Epoxi Co., Ltd, Japan) 301, γ-glycidoxypropyltrimethoxysilane (KBM 403, manufactured by Shin-Etsu Chemical Co., Ltd., Japan) in an amount indicated in Table 19 and 100 parts of methyl ethyl ketone was used as a base solution. EPOMIC® Q 635 was added to the solution as a curing agent, and the mixture was applied to a steel plate to form a primer. After 24 hours, the coating composition described in Example 48 was applied onto the primer using a 150μ applicator. The coating composition was cured for 10 days at room temperature, and thereafter the test were carried out. The results obtained are shown in Table 19.

TABLE 19

| Amount of glycidoxypropyl trimethoxysilan | 0 | 10 | 20 | 30 |
|---|---|---|---|---|
| Cross-cut adhesion test | 0/100 | 100/100 | 100/100 | 100/100 |
| Acetone immersion | — | Partial Peeling | No Change | No Change |
| Toluene immersion | — | Partial Peeling | No Change | No Change |
| Boiling water test | — | — | No Change | No Change |

EXAMPLE 52

Example 51 was repeated except that a mixture of 100 parts of Epomic 301, 15 parts of γ-aminopropyltrimethoxysilane (A 1110, manufactured by Nippon Yunkah, Japan), 4 parts of EPOMIC® Q 635 and 100 parts of methyl ethyl ketone was used as a primer. After the coating composition was cured for 10 days at room temperature, the tests were carried out. The cross-cut adhesion test provided 100/100, and no peeling of the coating films was observed by the toluene immersion test and the boiling water.

What is claimed is:
1. A solvent soluble fluorine-containing polymer which is:
(i) a copolymer consisting essentially of
(a) a fluoroolefin having 2 to 3 carbon atoms,
(b) a vinyl ether selected from the group consisting of alkyl vinyl ether and cycloalkyl vinyl ethers, and
(c) an organosilicon compound in which the organo portion of the molecule is a hydrocarbon containing unsaturated double bonds and which compound contains a hydrolyzable group,
(ii) said copolymer comprising, based on the total mole number of said (a)-(c) in the copolymer,

30-70 mol% of (a), 20-60 mol% of (b) and 1-25 mol% of (c), and (iii) said copolymer having a number average molecular weight (mn) of 3,000-200,000 as measured by gel permeation chromatography.

2. The solvent soluble fluorine-containing polymer according to claim 1 wherein said copolymer has a glass transition temperature (Tg) in the range of from $-60°$ to $20°$ C. as measured with a differential scanning calorimeter.

3. The solvent soluble fluorine-containing polymer according to claim 1 wherein said vinyl ether is alkyl vinyl ether.

4. The solvent soluble fluorine-containing polymer according to claim 3 wherein said alkyl vinyl ether is a lower alkyl vinyl ether having 8 or less carbon atoms.

5. The solvent soluble fluorine-containing polymer according to claim 1 wherein said organosilicon compound (c) is either one of compounds represented by the formulas $R^1R^2SiY^1Y^2$ (1), $R^1XSiY^1Y^2$ (2) and $R^1SiY^1Y^2Y^3$ (3) wherein $R^1$ and $R^2$, which may be the same or different, individually represent a hydrocarbon group having olefinically unsaturated bonds, X represents an organic radical having no olefinically unsaturated bonds, and $Y^1$, $Y_2$ and $Y^3$, which may be the same or different, individually represent a hydrolyzable group.

6. The solvent soluble fluorine-containing polymer according to claim 5 wherein the hydrolyzable group in the organosilicon compound (c) is vinyl trialkoxy silane or trialkoxyvinyloxyalkyl silane.

7. The solvent soluble fluorine-containing polymer according to claim 5 wherein X is selected from the group consisting of methyl, ethyl, propyl, tetradecyl, octadecyl, phenyl, benzyl and tolyl and said groups substituted by halogen.

* * * * *